UNITED STATES PATENT OFFICE.

HENRY ANHALTZER, OF PITTSBURGH, PENNSYLVANIA.

PIPE-CLEANING MIXTURE OR COMPOUND.

1,129,056.  Specification of Letters Patent.  Patented Feb. 23, 1915.

No Drawing.  Application filed June 22, 1914.  Serial No. 846,572.

*To all whom it may concern:*

Be it known that I, HENRY ANHALTZER, a citizen of the United States, and resident of Pittsburgh, in the county of Allegheny and State of Pennsylvania, have invented certain new and useful Improvements in Pipe-Cleaning Mixtures or Compounds, of which the following is a specification.

My invention relates to means for removing obstructions and sediment or collections of solids from waste or drainage pipes, conduits, sewers and similar apparatus used in conducting or storing water and other fluids.

One object of my invention is to provide an improved mixture or compound of novel composition and adapted when mixed with water to react upon and dissolve, disintegrate and liquefy collections of paper, rags, cellulose, vegetable matter, hair, leather, animal fats and similar carbonaceous bodies in contact therewith.

Another object of the invention is to provide a mixture or compound by the use of which accumulations of solid paraffin in oil wells and oil storage tanks are liquefied and in the use of which the paraffin is liquefied and the oil mechanically or chemically combined with the paraffin is recovered.

A further object of my invention is to provide a mixture or compound of novel composition which is adapted for use in thawing frozen water pipes and by the use of which the necessity of heating frozen pipes externally or by means of a flame is avoided and overcome.

A still further object of my invention is to provide a new and useful mixture or compound which when mixed with water will react and generate heat up to or above a temperature of 150 degrees centigrade.

Still further objects of my invention will become apparent as the invention is more fully described hereinafter and is specifically pointed out in the appended claims.

The invention consists broadly in a mixture or compound formed of aluminum, a hydroxid of an alkali metal, a highly oxygenated sulfur salt and a fluorid.

The invention further consists in a novel mixture of chemicals which when combined and mixed with water will react upon one another so as to evolve great heat and form a solution powerful enough to dissolve and liquefy carbonaceous matter.

In the preparation of my novel compound metallic aluminum, sodium or potassium hydroxid, potassium or sodium persulfate and potassium hydrogen fluorid preferably are used in about the following proportions by weight: metallic aluminum (preferably finely divided) 0.5 per cent. or more, sodium or potassium hydroxid 81.7 per cent., potassium or sodium persulfate 13.8 per cent., potassium hydrogen fluorid 4.0 per cent.

The chemical reaction which occurs upon mixing the above chemicals with water is shown in the following equation:

$$2Al + 6NaOH + 3K_2S_2O_8 + 3KHF_2 = 2Na_3AlO_3 + 3K_2SO_4 + 3KHSO_4 + 3H_2F_2$$

The above equation and a comparison of the molecular weights of the proportion of chemicals used therein will show that a great excess of the hydroxid is taken up. This is advantageous and necessary for the reason that should only the theoretical quantity of the alkali be employed, the action of the persulfate on the alkali will reduce the quantity of the alkali present to such an extent that the ensuing chemical reaction of the residual alkali upon the aluminum would be lessened or reduced to substantially *nil* and as the exothermic heat generated by the action of the alkali upon the aluminum is a part of the reaction desired, the presence of the very large excess of alkali, such as will be found in the above composition, is necessary and of great advantage. In addition to the thermic heat induced by the interaction of the aluminum with the alkali another and more highly efficient thermic reaction results between the double compound of the fluorid with the persulfate.

In preparing my improved compound for practical use the aluminum, (preferably in a finely divided state) is mixed with the hydroxid. The persulfate and the fluorid are packaged separately from each other and also from the mixture of aluminum and hydroxid, or in separate compartments of the commercial package to avoid and prevent the possibility of the chemical reaction which will occur should the chemicals be combined even when in a dry state.

In the use of my improved mixture or compound the contents of a package of chemicals in the proportions above specified are emptied into the metal pipe, tank, oil well or other conduit or container which is to be cleaned. In emptying the packaged materials into such pipe the chemicals will be automatically mixed. The necessary volume of water is then poured upon the mixture or compound, whereupon a reaction is started which instantaneously generates great heat. The resulting reaction is as follows: The action of the water in dissolving the hydroxid generates heat and this heat is intensified to a very great extent in dissolving the fluorid. The heated and now alkaline water simultaneously attacks the aluminum and persulfate, the action of the alkaline water on the aluminum generating hydrogen and its action on the persulfate forming sulfuric acid and generating oxygen. The nascent oxygen generated combines with the nascent hydrogen generated and forms water, so that the formation of dangerous explosive gases, as will be the case in the employment of the aluminum and the alkali alone as the reaction ends, is avoided and prevented and hot water vapor and steam is the only resulting effect. In further explanation of the reaction occurring it should be stated that the sulfuric acid resulting from the decomposition of the persulfate, acts upon the fluorid so as to decompose the fluorid into its elements and form hydrofluoric acid, this reaction causing an accession of heat and the hydrofluoric acid becoming dissolved in and combining with the water and becoming partially vaporized with the vapor ensuing from the heated water.

As a solution of persulfate in water or a solution of hydrofluoric acid in water, even when cold, will attack and after a certain given time, will entirely "rot" and disintegrate cellulose, fibrous or carbonaceous matter, it is therefore quite plain that the disintegration of such materials will occur in much less time, when the action is augmented by the heat produced in the chemical reaction and the time will be still further reduced owing to the formation, at one stage in the reaction, of sulfuric acid, this acid greatly aiding in the disintegration, being of assistance to such an extent that deposits and obstructions in pipes or other containers formed of the above described cellulose, fibrous or carbonaceous matter will be dissolved in the water present and will become liquefied so as to flow through or be readily removed from the pipe or other container.

By the reaction occuring with the use of my improved compound the sodium or potassium aluminate formed in the reaction is converted into a sulfate, and the sulfate, being very soluble, is quickly dissolved in the water present and remains fluid, so that instead of having a substance which hardens when cooled, such as sodium or potassium aluminate, which would be formed if aluminum and alkali only were employed, a fluid is obtained and the possibility of further clogging of the pipe or container is avoided and prevented.

The results obtained by the use of my improved mixture or compound will be more readily understood, by reference to the following partial and complete equations:

(a) $2Al + 6NaOH = 2Na_3AlO_3 + 3H_2$ (a) 2 Aluminum + 6 sodium hydroxid = 2 sodium aluminate + 3 hydrogen$_2$.

(b) $3K_2S_2O_8 + 3H_2O = 3K_2SO_4 + 3H_2SO_4 + 3.O$ (b) 3 Potassium persulfate + 3 water = 3 potassium sulfate + 3 sulfuric acid + 3 oxygen.

(c) $3H_2 + 3.O = 3H_2O$ (c) 3 Hydrogen + 3 oxygen = 3 water.

(d) $3H_2SO_4 + 3KHF_2 = 3H_2F_2 + 3KHSO_4$ (d) 3 Sulfuric acid + 3 potassium hydrogen fluorid = 3 hydrofluoric acid + 3 potassium hydrogen sulfate.

(e) $2Al + 6NaOH + 3K_2S_2O_8 + 3KHF_2 = 2Na_3AlO_3 + 3K_2SO_4 + 3KHSO_4 + 3H_2F_2$ (e) 2 Aluminum + 6 sodium hydroxid + 3 potassium persulfate + 3 potassium hydrogen fluorid = 2 sodium aluminate + 3 potassium sulfate + 3 potassium hydrogen sulfate + 3 hydrofluoric acid.

The advantages of my invention will be appreciated by those skilled in the art. By the use of my improved composition fibrous and carbonaceous matters are readily dissolved and the difficulties heretofore experienced in removing obstructions from pipes and conduits are easily and quickly overcome.

The materials forming my improved compound can be easily and cheaply obtained.

By the use of my improved compound sufficient heat is evolved to raise the temperature of frozen pipes (by frozen pipes is meant frozen water or other liquid conveyed into and through said pipes), considerably above that necessary to melt the ice formed therein and thereby remove the obstructing ice without mechanical labor.

Variations in the chemicals employed in forming my improved compound may be made without departing from my invention. The hydroxids of the chemicals used may be replaced by the oxids or peroxids thereof. The results obtained with the above described chemicals are also obtainable by using sodium or potassium pyro-sulfate ($Na_2S_2O_7$) and also crystals of pyro-sulfuric acid ($H_2S_2O_7$) or so called "solid sulfuric acid in conjunction with the other chemicals, by rearrangement of the molecular quantities of the chemicals. The addition of a small amount (one per cent. or more) of trioxy methylene or any other isomer of formaldehyde in solid form will supply a disinfecting agent although owing to the presence of the fluorid, the compound is to an extent a disinfectant. The proportions of the various chemicals used also may be varied within certain limits and other changes may be made within the scope of the appended claims. The word pipes as used in the claims is intended to cover oil wells or other holes and the word obstruction is intended to embrace paraffin and other hydro-carbons or carbonaceous matter.

I claim:—

1. The method of removing obstructions from pipes which consists in combining metallic aluminum, a hydroxid of an alkali metal, an oxygenated sulfur salt forming sulfuric acid when mixed with water, and a fluorid within the pipe to be cleaned and then adding water to promote and maintain the ensuing reaction and thereby disintegrate and liquefy the obstruction.

2. The method of removing obstructions from pipes which consists in combining metallic aluminum, a hydroxid of an alkali metal, a fluorid and an oxygenated sulfur salt forming sulfuric acid when mixed with water, within the pipe to be cleaned and then adding water to promote and maintain the ensuing reaction and thereby disintegrate and liquefy the obstruction.

3. The method of removing obstructions from pipes which consists in combining a mixture of metallic aluminum and sodium or potassium hydroxid with a mixture of fluorid of a fixed alkali and an oxygenated sulfur salt forming sulfuric acid when mixed with water within the pipe to be cleaned and then adding water to promote and maintain the ensuing reaction and thereby disintegrate and liquefy the obstruction in said pipe.

4. A composition of matter consisting of aluminum, a hydroxid of an alkali metal, a fluorid and an oxygenated sulfur salt forming sulfuric acid when mixed with water.

5. A composition of matter consisting of aluminum mixed with a hydroxid of an alkali metal, a fluorid and an oxygenated sulfur-salt forming sulfuric acid when mixed with water.

6. A composition of matter consisting of aluminum, a hydroxid of an alkali metal, a fluorid, formaldehyde and an oxygenated sulfur salt forming sulfuric acid when mixed with water.

7. A composition of matter consisting of aluminum mixed with a hydroxid of an alkali metal, a fluorid, formaldehyde and an oxygenated sulfur salt forming sulfuric acid when mixed with water.

8. As a new article of manufacture, a mixture consisting of metallic aluminum, a hydroxid of an alkali metal, an oxygenated sulfur salt of a fixed alkali, and a fluorid of a fixed alkali.

9. As a new article of manufacture, a mixture consisting of metallic aluminum, a hydroxid of an alkali metal, an oxygenated sulfur salt of a fixed alkali, a fluorid or a fixed alkali, and formaldehyde.

10. As a new article of manufacture, a mixture consisting of .5 per cent. metallic aluminum, 81.7 per cent. hydroxid of a fixed alkali, 13.8 per cent. of an oxygenated sulfur salt of a fixed alkali, and 4 per cent fluorid of a fixed alkali.

In testimony whereof, I have hereunto set my hand.

HENRY ANHALTZER.

Witnesses:
R. D. LITTLE,
F. B. BENTZ.